United States Patent

Jagers

[15] 3,695,135
[45] Oct. 3, 1972

[54] CIRCULAR SAW CONSTRUCTION
[72] Inventor: Leopold Jagers, Euskirchen Rhineland, Germany
[73] Assignee: Trennjager Maschinenfabrik, Euskirchen/Rhineland, Germany
[22] Filed: July 22, 1970
[21] Appl. No.: 57,158

[30] Foreign Application Priority Data
July 23, 1969 Germany..........P 19 37 321.8

[52] U.S. Cl. ...................83/455, 83/485, 143/47 E
[51] Int. Cl. ..............................................B26d 7/02
[58] Field of Search......143/47 E, 47 F; 83/455, 470, 83/488, 489, 485

[56] References Cited
UNITED STATES PATENTS

| | | | |
|---|---|---|---|
| 2,933,113 | 4/1960 | Meyer | 143/47 E |
| 3,294,129 | 12/1966 | Kohler et al. | 143/47 F X |

*Primary Examiner*—Andrew R. Juhasz
*Assistant Examiner*—Leon Gilden
*Attorney*—Michael S. Striker

[57] ABSTRACT

A housing of a circular saw is mounted for displacement in a predetermined direction and has an upper surface. A rotary saw blade is carried by the housing and projects at least in part upwardly of the upper surface thereof. Its general plane is coincident with the predetermined direction. Mounting means is provided for mounting —upwardly proximal to the upper surface of the housing—workpieces which in the aforementioned predetermined direction have at most a predetermined maximum dimension. Supporting plate means is provided on the upper surface of the housing movable with the same and in supporting engagement with a mounted workpiece. According to the invention the supporting plate means comprices a portion which projects beyond the saw blade in the predetermined direction by a distance which at least equals two thirds of the maximum dimension mentioned before to thereby offer additional support to the workpiece.

8 Claims, 8 Drawing Figures

INVENTOR
LEOPOLD JAGERS
BY
ATTORNEY

CIRCULAR SAW CONSTRUCTION

BACKGROUND OF THE INVENTION

The invention relates generally to circular saw constructions and more particularly to a circular saw capable of sawing through metallic workpieces. Still more particularly the invention relates to a circular saw capable of sawing through cold metallic workpieces having in the direction in which the sawing cut is being made, a dimension greater than the diameter of the saw blade itself.

Saws of this type are already known and are usually intended for making high-speed cuts. In these known constructions the saw blade together with its housing is advanced with reference to and beneath the workpiece which itself is clamped or otherwise secured on the frame or support of the saw. The workpiece is supported on a plate mounted on the frame or support of the saw itself and the housing is moved--together with the saw blade--beneath this place and thereby the workpiece.

Experience has shown that with saws constructed according to the prior art workpieces having substantial dimensions in the direction in which the cut is being made can be sawed with high speed only if care is taken that the saw blade is not subjected to forces exerted upon itself by the workpiece in direction transversely to the cutting direction. It is therefore already known to provide a gliding guide beneath the supporting plate for the workpiece and to spring-bias the housing of the saw against this guide to stabilize it during the cut. However, this construction is relatively complicated and therefore subject to malfunctions and to other difficulties. Aside from this it is of course necessarily expensive to produce and therefore to sell.

SUMMARY OF THE INVENTION

It is, accordingly, an object of the present invention to provide a circular saw of the type under discussion which is not possessed of the disadvantages outlined above with respect to the prior art.

More particularly it is an object of the present invention to provide such a circular saw which makes it possible to make high-speed cuts through material of the type and configurations already outlined above, but whose construction is much simpler than that known from the prior art and whose reliability is therefore also increased.

In pursuance of the above objects, and others which will become apparent hereafter, one feature of the invention resides, in a circular saw, in a combination which briefly stated comprises housing means mounted for displacement in a predetermined direction and having an upper surface. A rotary saw blade is carried by the housing means and projects at least in part upwardly of the upper surface thereof. Its general plane is coincident with the predetermined direction of advancement or displacement of the housing means. Mounting means is provided for mounting upwardly proximal to the upper surface work pieces having in the aforementioned direction at most a predetermined maximum dimension. Finally, and according to the present invention, supporting plate means is provided on the upper surface of the housing means movable with the latter and being in supporting engagement with a mounted workpiece. This supporting plate means comprises a portion which projects beyond the saw blade in the aforementioned predetermined direction and by a distance which at least equals two thirds of the aforementioned maximum dimension. This assures that throughout the entire cut the workpiece will always be supported by the projecting portion of the supporting plate means, thereby eliminating the possibility that transverse forces could act upon the saw blade with the resulting disadvantages.

According to another embodiment the mounting means provided for mounting of the workpieces is of such construction that it presses from above against the workpiece and thereby presses the latter against the upper surface of the supporting plate means. Furthermore, it is advantageous it the supporting plate means, which may but need not be of metallic material, is provided with a slot elongated in the aforementioned predetermined direction so that the saw blade can project upwardly through it with the result that portions of the blade are also located at opposite axial sides of the blade and provide further support for the workpiece. In this case the portions which are located at opposite axial sides of the saw blade are in suitable manner supported on or by the housing means to prevent them from becoming deflected, for instance under the weight of the workpiece.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
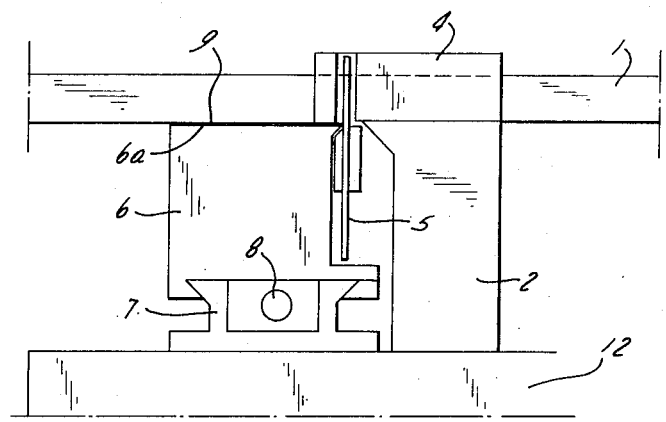
FIG. 1 is a diagrammatic end-elevational view illustrating one embodiment of the invention.

Discussing now the drawing in detail, and firstly the embodiment in FIGS. 1-4, it will be seen that the circular saw according to the present invention comprises a base 12 on which there is mounted a sliding guide arrangement 7 of the so-called dovetail type which is already well known in the art and requires no further discussion. It is pointed out, however, that the guide 7 guides the housing 6 of the circular saw for displacement in a predetermined direction which is indicated by the arrow A (see FIG. 2). Further provided on the base 12 is an upwardly extending frame portion 2 which carries in the region of its upper end two mounting jaws 3 and 4. The jaw 4 is stationary in so far as the direction indicated by the arrow A (or the opposite direction) is concerned, whereas the jaw 3 can be moved towards and away from the jaw 4 as indicated by the arrow B (see FIG. 2). The jaws 3 and 4 can be moved apart from one another by a maximum distance $a$ (see FIG. 2) which corresponds to the maximum dimension of a workpiece to be clamped between them. The workpiece is identified with reference numeral 1 and it will be appreciated that ordinarily this dimension $a$ will be the width of the workpiece and that the length of the workpiece is to be understood as being normal to the dimension $a$, such as indicated in FIG. 1.

Figure 2:
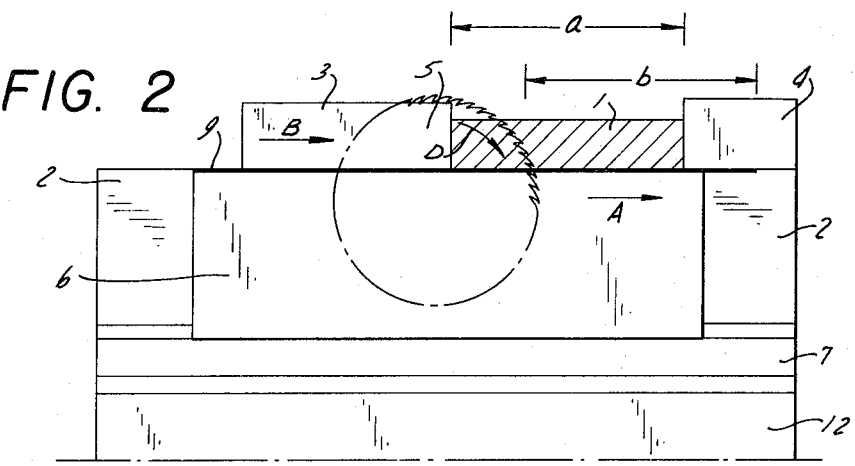
FIG. 2 is a similarly diagrammatic side-elevational view of FIG. 1.

The housing 6 carries the rotatable saw blade 5 whose axis of rotation is diagrammatically shown in FIG. 2. Details of the saw blade 5, its mounting and its drive, both of the latter being accommodated in the housing 6, is not thought to be necessary not only because they are wholly conventional and any suitable constructions may be utilized, but also because they do not themselves form a part of the present invention. The direction of rotation of the saw blade 5 is indicated in FIG. 2 with the curved arrow D.

According to the present invention there is mounted on the upper surface 6a of the housing 6 a supporting plate—preferably of metallic material and planar—9 which moves with the housing 6. The plate 9 should be relatively sturdy so that when a weight is placed on it it will not bend or be deflected. According to the invention, however, what is essential is that the blade 9 comprise a portion which projects forwardly of the saw blade 5 by a distance $b$ which is at least equal to two thirds of the dimension $a$. This is indicated in FIG. 2 where a comparison of the dimensions $a$ and $b$ will show that. In other words, the length of the projecting portion of the plate 9, that is the length or dimension $b$ shown in FIG. 2, must be at least equal to two thirds of the maximum dimension $a$ of workpieces 1 which can be accommodated and clamped between the jaws 3 and 4. Incidentally, it is not believed to be necessary to discuss how the jaw 3 can be moved and secured with reference to the jaw 4, again because this is well known and forms no part of the present invention.

If the plate 9 is of metallic material as is usually the case, then its upper surface is hardened and ground or otherwise made suitably planar, such upper surface being located in a plane common both to it and to a surface of the frame portion 2 on which the workpiece 1 can in part rest. Thus, as far as the longitudinal extension of the workpiece 1 is concerned, a portion of the workpiece 1 rests on the forwardly projecting portion of the plate 9 whereas another portion of the workpiece 1 longitudinally spaced from the first-mentioned portion rests on the aforementioned surface of the frame 2. It is clear without detailed discussion that the surface of the frame 2 is stationary with reference to the workpiece whereas the projecting portion of the plate 9 moves with reference to the workpiece 1 as the plate 9 moves with the housing 6 and the saw blade 5, which latter at such times cuts into and through the workpiece as it travels in the direction of the arrow A in FIG. 2. The blade 5 tends to press the workpiece 1 downwardly against the surface of the projecting portion of the plate 9 whereby the workpiece 1 is reliably retained on the plate and supported with reference to the saw blade 5, and the shaft thereof, so that undesired development and exertion of various forces upon the saw blade 5 transversely to the cutting plane are avoided.

Figure 3:
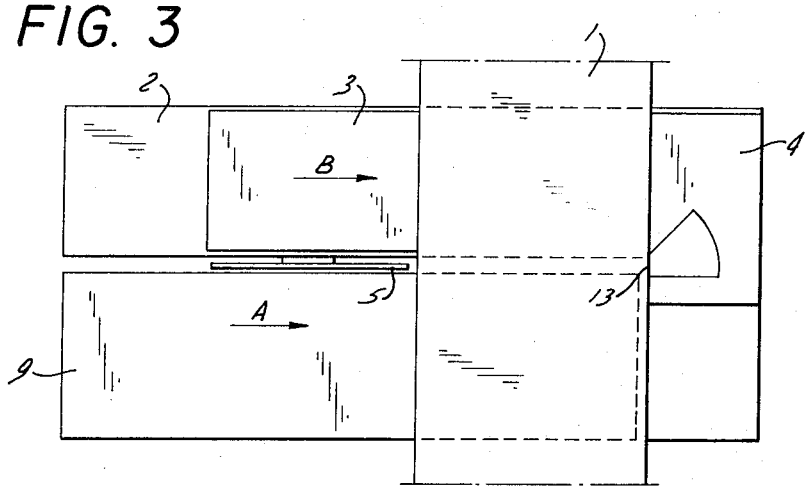
FIG. 3 is a diagrammatic top-plan view of the embodiment in FIGS. 1 and 2 showing the saw blade in one position with reference to the workpiece to be cut.

FIG. 3 shows the illustrated and thus-far discussed embodiment in one position of the saw blade 5 with reference to the workpiece 1, namely where a cut at right angles to the elongation of the workpiece 1 is to be carried out.

It should be mentioned parenthetically that the motor for effecting the rotation of the saw blade 5 may be mounted on or in the housing 6 and that the advancement of the housing 6 with the blade 5 is carried out by means of a conventional spindle 8 which may be rotated by a non-illustrated motor in known manner. Again it is emphasized that none of this is a part of the present invention and is in any case well known to those skilled in the art.

Figure 4:
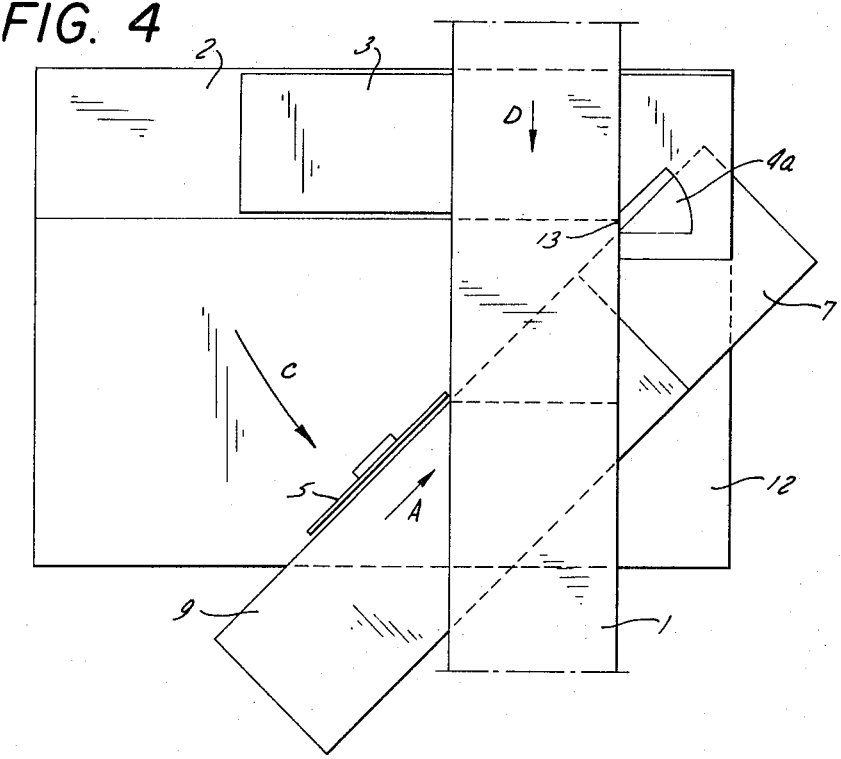
FIG. 4 is a view similar to FIG. 3 but showing the saw blade of that embodiment in a different position with reference to the workpiece to be cut.
Figure 5:
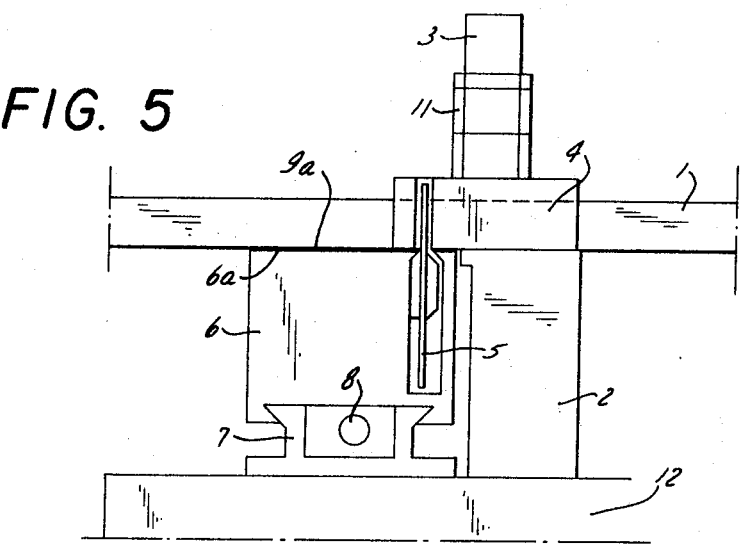
FIG. 5 is a view similar to FIG. 1 but illustrating a further embodiment of the invention.
Figure 6:
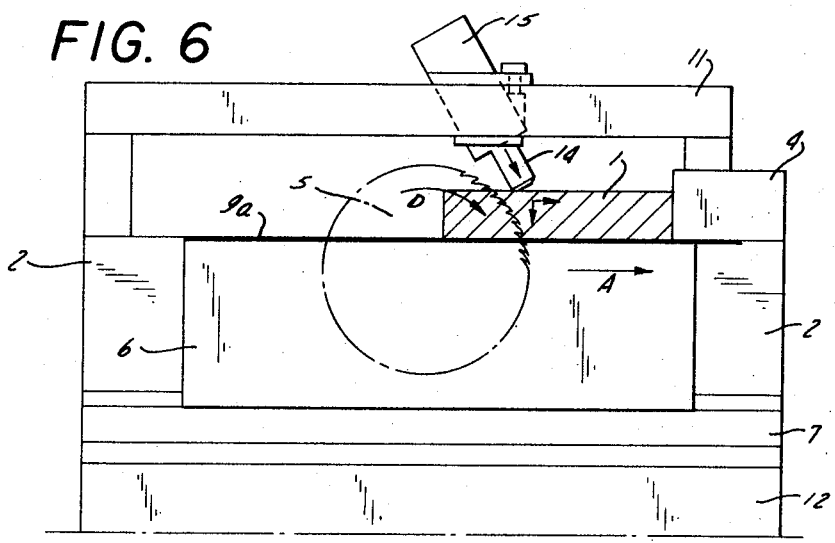
FIG. 6 is a view similar to FIG. 2 but of the embodiment shown in FIG. 5.

FIG. 4 shows the embodiment of FIGS 1 and 3 when the saw blade 5 is to be used to cut into and through the workpiece 1 in a direction other than at a right angle to the elongation of the workpiece 1. For this purpose the guide 7 together with the housing 6 and the plate 9 can be pivoted about an upright or vertical axis 13 (diagrammatically indicated) in the direction of the curved arrow C which is in the plane of abutment of the stationary jaw 4. The latter has a cut-out 4a so configurated that it permits an entry into the cut-out of portions of the saw blade 5 at any angle between 0° and 45°. The workpiece 1 may be advanced lengthwise in the direction of the arrow D in suitable manner and of course the housing 6 with the saw blade 5 and the supporting plate 9 will be advanced in the direction of the arrow A as before.

Coming to the embodiment illustrated in FIGS. 5–8 it is emphasized that this is quite similar to that of FIGS. 1–4 which differs from it only in that the movable jaw has been constructed and arranged in a different manner and that the plate 9 has been replaced with a somewhat differently configurated plate. Otherwise identical reference numerals have been employed in FIGS. 5–8 to indicate components already discussed with reference to FIGS. 1–4.

Keeping this in mind it is pointed out that in FIGS. 5–8 the movable jaw of the mounting means is identified with reference numeral 14 and movable in a fluid-operated—preferably hydraulically actuated—cylinder 15 in a direction which is inclined to the vertical and positioned in a vertical plane in the direction of advancement A of the housing 6. Thus, and this is particularly clearly shown in FIG. 6, the jaw 14 can press the workpiece 1 downwardly against the upper surface of the supporting plate which here is identified with reference numeral 9a. The cylinder 15 is mounted on a bridge or guide 11 which in turn is secured to the frame portion 2 and which extends in the direction of advancement A of the housing 6; the mounting may be accomplished by means of screws 10 or the like and is such that the cylinder 15 can be displaced lengthwise of the bridge or support 11.

In this embodiment, as already mentioned before, the plate member 9a is somewhat different from the plate member 9 in FIGS. 1–4. Specifically, in the embodiment of FIGS. 5–8 the plate member 9a is provided with a slot extending in the direction of the arrow A, as indicated with reference numeral 9b in FIG. 7, and the saw blade 5 projects upwardly in part through this slot 9b. In view of this the plate member 9a of course has auxiliary portions 9a' and 9a" which are located at opposite axial sides with reference to the saw blade 5 and which thus project to opposite axial directions relative to the saw blade 5. They serve as additional support for the workpiece and are supported—that is both of them—rigidly by the housing 6 in such a manner that the plate member 9a is a rigid unit. In other words, flexing or deflecting of the portions 9a' and 9a" with reference to one another—which would not occur in the absence of the slot 9b—must be prevented. This, again, prevents the exertion of lateral forces upon the saw blade 5, just as does the primary feature of the invention, namely that in the embodiment of FIGS. 5–8 again a portion of the blade 9a projects forwardly of the saw blade 5 with such portion having an extension or elongation corresponding to the dimension a indicated in FIG. 2.

Figure 7:
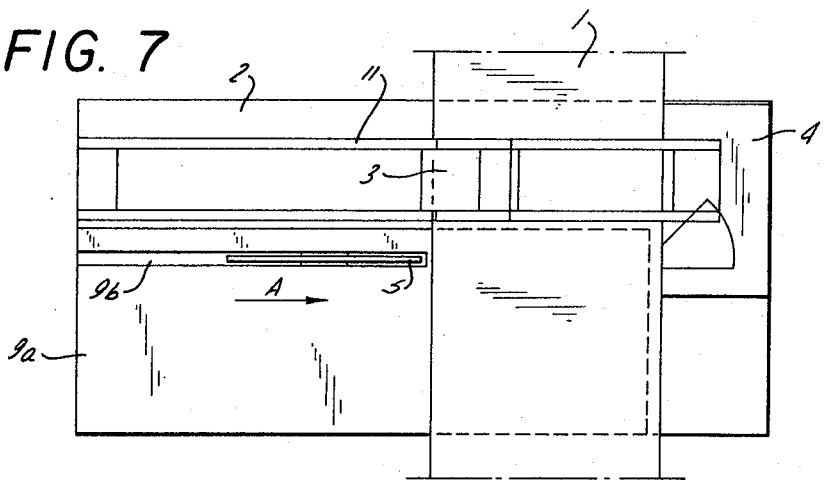
FIG. 7 is a view similar to FIG. 3 but showing the embodiment of FIG. 5 in the same position as that shown in FIG. 3.
Figure 8:
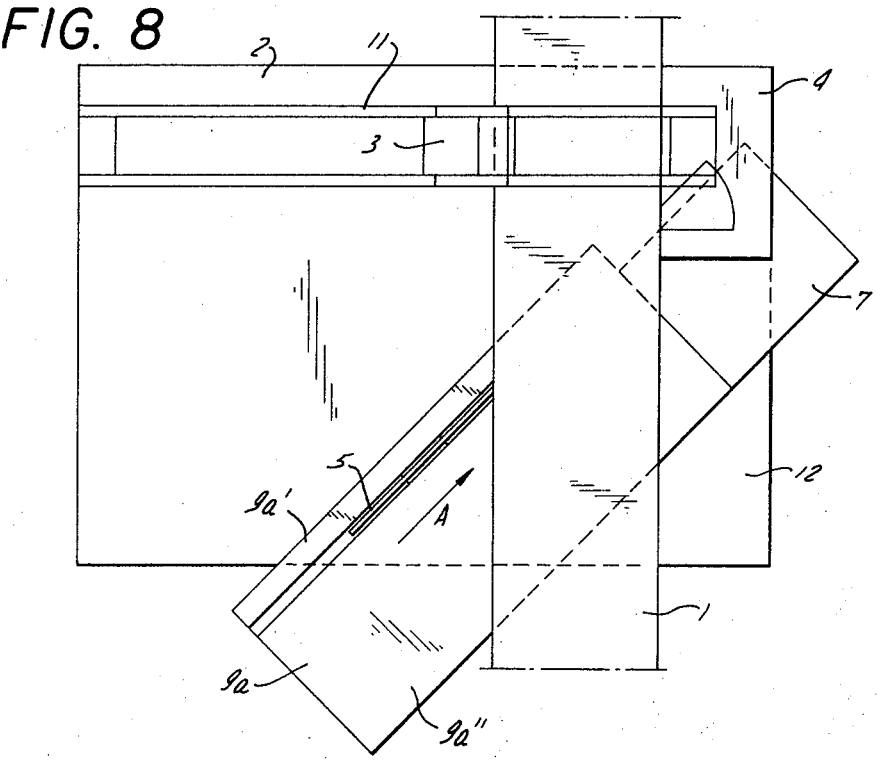
FIG. 8 is a view similar to FIG. 4 and corresponding in the illustrated position to that shown in FIG. 4, but showing the embodiment of FIGS. 5-8.

FIG. 7 is of course a view illustrating the embodiment of FIGS. 5–8 in the same operational position as FIG. 3 illustrates the embodiment of FIGS. 1–4, whereas FIG. 8 is a view similar to FIG. 4 but illustrating the embodiment of FIGS. 5–8.

It will be understood that each of the elements described above, or two or more together, may also find a useful application in other types of constructions differing from the types described above.

While the invention has been illustrated and described as embodied in a circular saw, it is not intended to be limited to the details shown, since various modifications and structural changes may be made without departing in any way from the spirit of the present invention.

Without further analysis, the foregoing will so fully reveal the gist of the present invention that others can be applying current knowledge, readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a circular saw, in combination, support means defining a gap and having at opposite sides of said gap respective upper surfaces located in an at least substantially horizontal common plane; means mounted for displacement in said gap intermediate said upper surfaces in a predetermined direction; a rotary saw blade carried by said movable means projecting at least in part upwardly beyond said common plane and having a general plane coincident with said predetermined direction; mounting means including at least two mounting elements movable apart by a maximum mounting distance in which they can engage and retain against movement a workpiece which extends across said gap and is supported on said upper surfaces, such workpiece having in said direction a dimension which at most equals said maximum mounting distance; and supporting plate means carried by said movable means and having an upper face located in said common plane for engaging and supporting said workpiece intermediate said upper surfaces, said supporting plate means comprising a portion projecting beyond said saw blade in said predetermined direction by a distance which equals at least two thirds of said maximum mounting distance, and said supporting plate means being movable with said movable means relative to and beneath said workpiece so that the latter is supported in said gap by said upper face of said portion while being sawed by said saw blade.

2. In a circular saw as defined in claim 1, said movable means being pivotable about a vertical axis with reference to said support means.

3. In a circular saw as defined in claim 1, said upper face of said supporting plate means being flat.

4. In a circular saw as defined in claim 1, said supporting plate means consisting of metallic material.

5. In a circular saw as defined in claim 1, at least one of said mounting elements urging the mounted workpiece into engagement with said supporting plate means.

6. In a circular saw as defined in claim 1, said saw blade having two axial sides facing transversely of said predetermined direction; and wherein said supporting plate means comprises additional portions which respectively project beyond said axial sides transversely of said predetermined direction in said gap so as to support corresponding portions of the mounted workpiece.

7. In a circular saw as defined in claim 6, said supporting plate means having a slot elongated in and coincident with said predetermined direction, and said saw blade projecting through said slot.

8. In a circular saw as defined in claim 6, said additional portions being associated with said movable means in a sense supporting them against deflection.

* * * * *